United States Patent [19]
Chen et al.

[11] Patent Number: 6,020,975
[45] Date of Patent: Feb. 1, 2000

[54] SYSTEM AND METHOD FOR ACCELERATED DATA RECOMPRESSION

[75] Inventors: Kok S. Chen, Sunnyvale; Magnus Karlsson, Milpitas; Hungviet H. Nguyen, Fremont, all of Calif.

[73] Assignee: Apple Computer, Inc., Cupertino, Calif.

[21] Appl. No.: 08/770,898

[22] Filed: Dec. 20, 1996

[51] Int. Cl.[7] .............. B41B 15/00; H04N 1/00; H04N 1/40

[52] U.S. Cl. .......... 358/1.16; 358/1.16; 358/1.11; 358/1.1; 358/1.15; 358/1.17; 358/1.13; 358/1.18; 358/404; 358/444

[58] Field of Search .................. 395/115, 110, 395/101, 114, 116, 112, 117; 358/404, 444, 116, 1.11, 1.1, 1.15, 1.17, 1.13, 1.18

[56] References Cited

U.S. PATENT DOCUMENTS

| | | | |
|---|---|---|---|
| 5,544,286 | 8/1996 | Laney | 395/114 |
| 5,544,290 | 8/1996 | Gentile | 395/115 |
| 5,638,498 | 6/1997 | Tyler et al. | 395/117 |
| 5,706,413 | 1/1998 | Takabayashi et al. | 395/110 |
| 5,838,334 | 11/1998 | Dye | 345/503 |

*Primary Examiner*—Edward L. Coles
*Assistant Examiner*—Twyler Lamb
*Attorney, Agent, or Firm*—Burns, Doane, Swecker & Mathis, L.L.P.

[57] ABSTRACT

A system for accelerated data recompression in which uncompressed data need not be swapped in and out of memory at each iterative data recompression step. The data recompression system includes a main memory for storing image data, and a decompression device which receives compressed data from the main memory and decompresses it to produce discrete blocks of uncompressed data. An intermediate compression buffer, separate from the main memory and connected to the decompression device, is used by the decompression device to store one block of uncompressed data at a time. The blocks of data are received one at a time by a data compression device taking input directly from the intermediate compression buffer. There the uncompressed data blocks are compressed and stored back to the main memory one block at a time. Thus, an entire compressed image stored in main memory is decompressed and recompressed one block at a time, and uncompressed data need not be swapped in and out of main memory. As a result, overall data recompression speed is greatly improved.

11 Claims, 2 Drawing Sheets

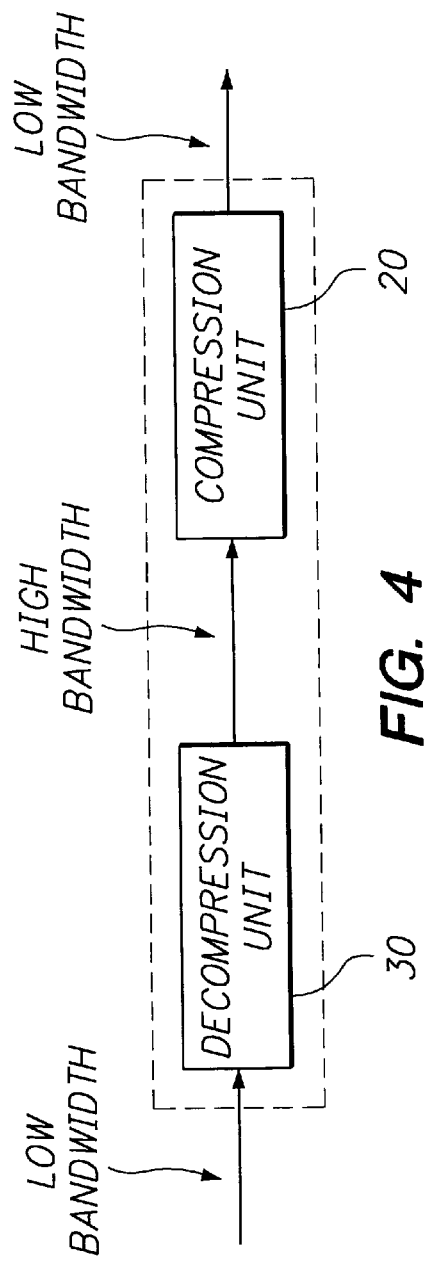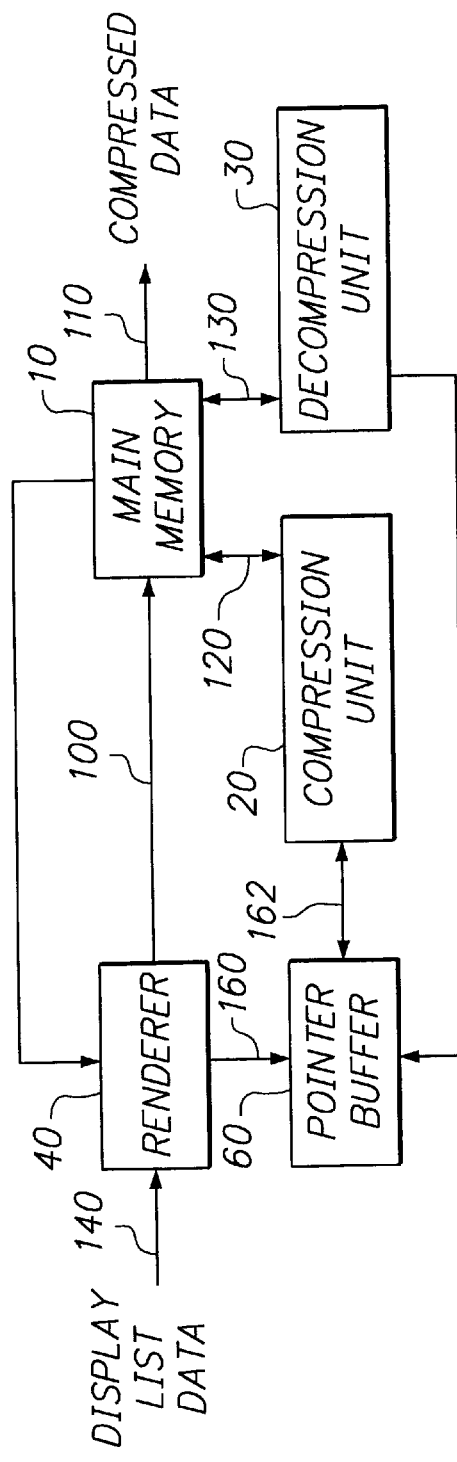

SYSTEM AND METHOD FOR ACCELERATED DATA RECOMPRESSION

FIELD OF THE INVENTION

The present invention relates to data compression systems, and more particularly to data recompression systems in which data is compressed, decompressed, and recompressed in an iterative fashion.

BACKGROUND OF THE INVENTION

Demands for faster, higher-resolution computer graphics systems compel manufacturers of such systems to develop ever more sophisticated means by which the volumes of data required to produce high-quality images are transmitted and processed. In particular, makers of color graphic printers are relying more heavily upon data compression techniques to construct affordable printers which produce high resolution images, and provide broad color palettes, without employing prohibitively expensive quantities of internal memory. For example, a 600 pixel-per-inch printer employing four bytes of data per pixel (each byte corresponding to one of the additive primary colors cyan, magenta, yellow, and black) and generating 8.5 inch by 11 inch printed images, requires 128 megabytes of memory for each uncompressed image. In contrast, a compressed version of such an image can typically be stored in approximately eight megabytes of memory.

In some data compression procedures, the data for an image to be printed is compressed, decompressed, and then recompressed in an iterative fashion such that the resulting amount of image data is small enough to be stored within a fixed memory buffer internal to the printer. For example, the industry standard Joint Photographic Experts Group (JPEG) compression technique employs a quality factor as a bounding parameter. When this technique is employed, the quality of a compressed JPEG image, and the corresponding size of that compressed image, can vary in proportion to the quality factor used during data compression. Since the quality factor is the only parameter that is specified, and the amount of compression is dependent upon the actual data, the precise size of the compressed image data cannot be known prior to compression. As a result, compressed data may have to be recompressed, using a lower quality factor to obtain further reduction, before it is sent to a destination having a relatively small, fixed memory capacity.

Another type of image processing procedure which employs data recompression is disclosed in U.S. Pat. Ser. No. 08/482,877.In that procedure, a previously compressed image is decompressed so that new image content can be incorporated within it, and the resulting new image can be recompressed for storage in an internal printer buffer. U.S. Pat. Ser. Nos. 08/462,619, 08/463,782 and 08/463,783 describe other useful image-data processing techniques which employ recompression. While complete knowledge of these applications is not a prerequisite to understanding the present invention, they provide useful background information, and are thus incorporated in their entireties herein by reference.

Although data processing techniques which employ recompression provide means for producing high-resolution images without requiring excessive amounts of printer memory, they may necessitate frequent swapping of large amounts of image data to and from memory during the data decompression and recompression processes. Such continual data swapping can reduce image throughput rates from the perspective of an end user. To illustrate, FIGS. 1 and 2 depict two data recompression configurations. Referring to FIG. 1, data compression and recompression generally involves passing a certain amount uncompressed image input data, such as one horizontal band of a page, via memory input lines 100 to a main memory buffer 10 so that it may be compressed, and recompressed as necessary, before being sent on to a final destination, such as a printer frame buffer, via data output lines 110. In operation, a compression unit 20 reads uncompressed data from the main memory 10 via compression unit interface lines 120, compresses the data according to a predefined data compression algorithm, and writes the compressed data back to the main memory 10 via the compression unit interface lines 120.

The precise data compression algorithm used by the compression unit 20 will vary from printer to printer, and from application to application. Different algorithms can even be used within the same document, depending upon the content of various pages. The detailed operations of available compression techniques are not critical to an understanding of the present invention, and are thus omitted here. It should be noted, however, that the quantity of compressed output data produced for a given quantity of uncompressed input data can vary in accordance with one or more compression parameters associated with the particular data compression algorithm that is employed.

Should compressed data stored in the main memory 10 of the system of FIG. 1 need to be recompressed, for example to reduce it further, a decompression unit 30 reads the compressed data from the main memory 10 via decompression unit interface lines 130, decompresses it by performing the inverse of the data compression algorithm used by the compression unit 20, and writes the data back to the main memory 10 via the decompression unit interface lines 130. At that point, the compression unit 20 again reads uncompressed data from the main memory 10 via the compression unit interface lines 120, compresses it using an adjusted quality factor, and writes it back to the main memory 10 via the compression unit interface lines 120. This recompression process is carried out in an iterative fashion until the size of the compressed image residing in the main memory 10 is small enough to be passed on to its destination.

While such an approach can function to reduce the printer frame buffer to a reasonable size, it requires that a large amount of data be repeatedly swapped in and out of main memory. More particularly, data for an entire uncompressed image may need to be transmitted from the decompression unit 30 to the main memory 10, and from the main memory 10 to the compression unit 20, during each iterative step of the recompression process. Since repeated reading and writing of large blocks of data can slow image throughput to unacceptable levels, it is desirable to provide a data recompression system that does not require swapping uncompressed data in and out of printer memory.

FIG. 2 depicts an approach to data recompression that might be employed, for example, in a system of the type described in the previously referenced applications. As shown, display list data is passed via renderer input lines 140 to a rendering unit 40 which processes, or renders, graphic objects provided in the display list to produce an uncompressed graphic image. The uncompressed graphic image is passed via memory input lines 100 to a main memory 10, where it is compressed by the compression unit 20 and restored in the memory 10. Data in the main memory 10 must be recompressed when additional object data on the display list is input to the rendering unit 40. In such a case, the decompression unit 30 reads compressed data from the main memory 10 via decompression unit interface lines 130, decompresses it by performing the inverse of the compression algorithm employed by the compression unit 20 to originally compress the data, and writes the decompressed data back to the main memory 10 via the decompression unit interface lines 130. At that point, the renderer 40 processes the updated display list data to modify the decompressed image stored in main memory 10 so that it reflects the additions and changes which are stored in the display list.

Once the entire image has been modified in this manner, the compression unit 20 reads the uncompressed data from main memory 10 via the compression unit interface lines 120, compresses it typically using the same quality factor that was used previously, and writes it back to main memory 10 via the compression unit interface lines 120. Because data compression is a computation-intensive and time consuming task, iteratively modifying images in this fashion can reduce image-data throughput levels. In particular, if the additional data on the display list affects only a small portion of the image, a large amount of data processing and memory access time may be unnecessarily carried out. Thus, there is a need for a data recompression system which minimizes the quantity of data which must be swapped in and out of memory due to additions or changes in a display list input.

SUMMARY OF THE INVENTION

The present invention fulfills the above-described and other needs by providing a data recompression system which does not need to swap an entire uncompressed image to and from main memory during each iterative data recompression step. A data recompression system constructed in accordance with the present invention includes a main memory for storing image data, and a decompression device which receives compressed data from the main memory and decompresses it to produce discrete blocks of decompressed data. A high-speed dedicated buffer, separate from the main memory and connected to the decompression device, is used by the decompression device to store one block, or a limited number of blocks, of decompressed data at a time. The blocks of data are then received one at a time by a data compression device taking input directly from the buffer. The compression device compresses the uncompressed data blocks, and writes them back to the main memory, one block at a time. Thus, an entire compressed image stored in main memory is decompressed and recompressed one block at a time, and uncompressed image data need not be swapped to and from main memory. As a result, overall speed of the data recompression process is significantly increased.

Further features of the present invention are explained hereinafter with reference to illustrative examples shown in the accompanying drawings.

BRIEF DESCRIPTION OF THE DRAWINGS

FIG. 4 is a conceptual block diagram of the data recompression process.

FIG. 5 is a conceptual block diagram of a data recompression system constructed in accordance with another embodiment of the present invention.

Detailed Description of the Preferred Embodiments

One particular situation in which data recompression can be employed to great advantage is in the printing of images, including textual documents. By compressing the data for a full page to a predetermined maximum amount, smaller memories can be employed in printers, thereby reducing their overall cost. Accordingly, to facilitate an understanding of the invention, it will be described hereinafter with reference to its implementation in a printer. It will be appreciated, however, that the practical applications of the invention are not limited to this particular environment. Rather, the principles which underlie the invention can be employed in a variety of situations where data recompression is desirable.

Figure 3:
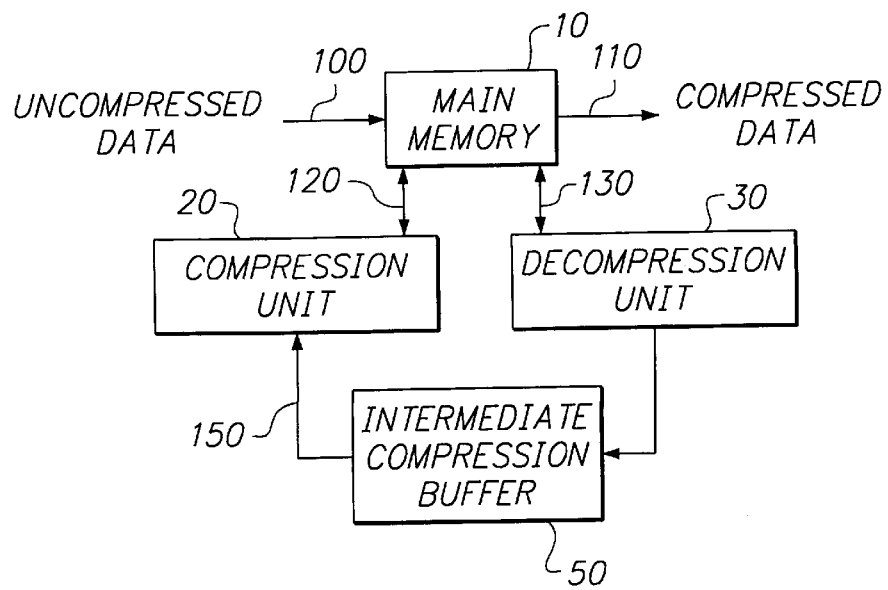
FIG. 3 is a conceptual block diagram of a data recompression system constructed in accordance with a first embodiment of the present invention.

FIG. 3 depicts a conceptual block diagram of a first embodiment of the present invention. As shown, uncompressed input data is received via memory input lines 100 by a main memory buffer 10 so that it may be compressed before being sent via data output lines 110 to a destination device (e.g., a printer marking engine or a printer frame buffer). As described above with respect to FIG. 1, compressed data in memory 10 may require iterative recompression so that it fits within a fixed, finite amount of memory associated with the destination device.

The data recompression process can be visualized as shown in FIG. 4. Referring thereto, data having low bandwidth requirements, i.e. compressed data, is supplied to the first component of the recompression process, namely the decompression unit 30. This data is converted into high bandwidth, uncompressed data and supplied to the compression unit 20. In this unit, the data is compressed again into low bandwidth data, which is then supplied to the main memory or other utilization device. The output data of the recompression process may be more compressed than the input data to the decompression unit 30, e.g. a lower quality factor may be employed in the compression algorithm.

Figure 1:
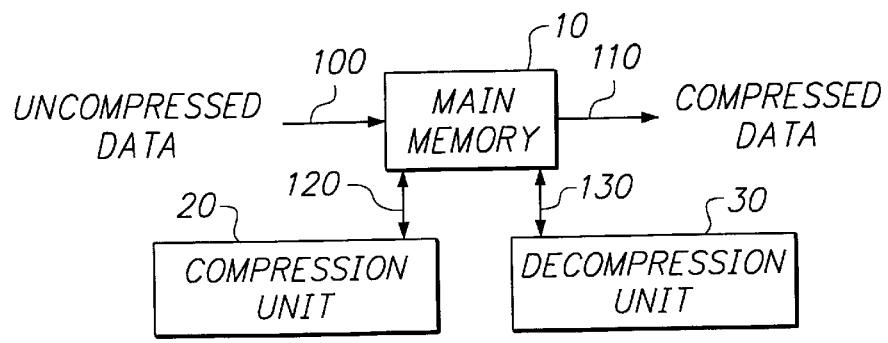
FIG. 1 is a conceptual block diagram of an illustrative data recompression system.

In conventional systems of the type depicted in FIG. 1, the highbandwidth transformation of data from the decompression unit 30 to the compression unit 20 takes place through the medium of the main memory 10. Because of cost considerations, among others, the memory which is typically employed for this purpose is relatively slow. As a result, throughput is dramatically decreased by the need for large data transfers through the memory. However, in accordance with one aspect of the present invention, data recompression is accomplished without the need to swap uncompressed data in and out of main memory 10, by exploiting the fact that most data compression-decompression algorithms work on independent blocks of data. For example, the industry standard JPEG technique operates on independent, 64-pixel, uncompressed input arrays to create compressed output blocks which vary in length depending upon the specified quality factor.

When the data in main memory 10 needs to be recompressed, a decompression unit 30 retrieves the compressed data from main memory 10 via decompression unit interface lines 130. The decompression unit 30 then decompresses a first block of compressed data, and transmits the decompressed data to the compression unit 20 via a dedicated data link 150. As part of this transfer, the decompressed block can be stored in an intermediate compression buffer 50. In operation, the decompression unit 30 detects break points between compressed blocks stored in main memory 10 by means of block pointers stored within the compressed data itself. The compression unit 20 recompresses the decompressed data block using an adjusted compression parameter (e.g., a new JPEG quality factor), and stores the resulting compressed data block in main memory 10 via compression unit interface lines 120. This decompression/compression cycle is performed for each block of originally compressed data until all of the originally compressed data has been recompressed. In this way, recompression is achieved without requiring that decompressed data be written to and read from main memory 10.

In the foregoing operation, entire sets of uncompressed data are not transmitted between the main memory 10 and the compression and decompression units 20,30. Instead, single blocks (or, alternatively, small numbers of blocks) of uncompressed data are transmitted from the decompression unit 30 to the compression unit 20 via the dedicated data link 150. Therefore, the relatively small intermediate compression buffer 50 can be implemented with very high-speed memory at reasonable cost. As a result, the exemplary embodiment can perform data recompression at much faster rates.

Further in this regard, since the data interface 150 for transferring data from the decompression unit 30 to the compression unit 20 is a dedicated memory interface, there is no need to use the existing interface for the main memory, and the data transfer can be effected more quickly. In particular, since the only data which is read from and written into the main memory 10 is compressed data, which is much smaller in amount than uncompressed data and hence has lower bandwidth requirements, the data transfers involved in the recompression process take place much faster. The compression unit 20, the decompression unit 30, the intermediate compression buffer 50, and the dedicated data interface 150 of the exemplary embodiment can all reside on one subsystem (e.g., on one application specific integrated circuit, or ASIC) within the overall data recompression system. In such a case, performance of the exemplary embodiment is limited only by the speed of operation of the compression and decompression units 20,30 themselves.

Although the intermediate compression buffer 50 is shown as a discrete unit for ease of understanding, it can be easily incorporated into either the compression unit 20 or the decompression unit 30. In a preferred embodiment, an intermediate compression buffer 50 is incorporated within the decompression unit 30.

FIG. 5 depicts another exemplary embodiment of the present invention which minimizes the quantity of data that is recompressed ue to changes in an image display list. This minimization is achieved by exploiting not only the fact that most compression algorithms work on discrete blocks of data, but also the fact that changes in a display list typically do not affect all regions within an overall image.

Figure 2:
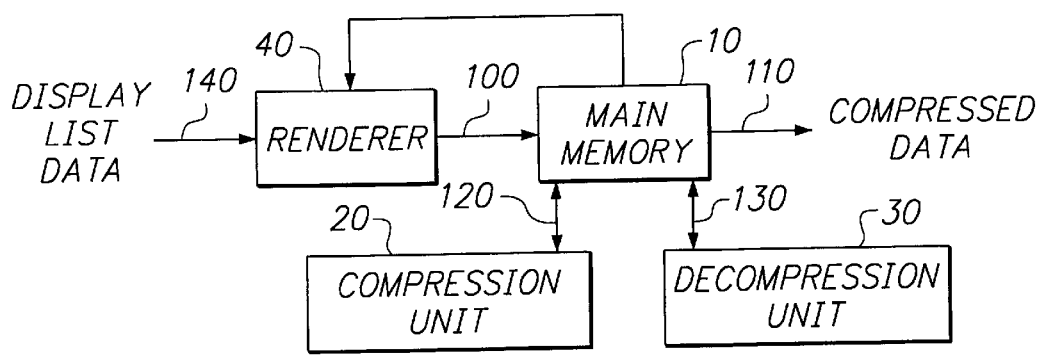
FIG. 2 is a conceptual block diagram of an alternative data recompression system.

As shown in FIG. 5, display list data is passed via renderer input lines 140 to a rendering unit 40 which renders objects in the display list to produce an uncompressed image. The uncompressed image is passed via memory input lines 100 to a main memory 10, where it is compressed before being passed to a destination device via data output lines 110. As described with respect to FIG. 2, compressed data in main memory 10 may need to be recompressed so that changes in the display list can be incorporated.

In such a case, the decompression unit 30 receives the compressed data from the main memory 10 via decompression unit interface lines 130. The decompression unit 30 decompresses the compressed data by performing the inverse of the compression algorithm employed by the compression unit 20 to originally compress the data. The decompression unit 30 writes the decompressed data back to the main memory 10 via the decompression unit interface lines 130. In addition, the decompression unit 30 stores pointers in a buffer 60. Each pointer identifies the memory location of compressed data in the main memory 10 which corresponds to a block of decompressed data. Associated with each pointer is a flag bit.

Once the decompressed data has been written back to main memory 10, the renderer 40 uses the updated display list to modify the decompressed image stored in main memory 10 so that it reflects the additional object data in the display list. At the same time, the renderer 40 sets appropriate flag bits within the pointers/flags buffer 60 to indicate which of the decompressed blocks has been modified. In other words, if the renderer modifies a given block, then it may, for example, set the flag bit corresponding to that block to 1.

Once the entire image has been modified to incorporate the additions in the display list, the compression unit 20 receives the uncompressed data from main memory 10 via the compression unit interface lines 120. The compression unit 20 compresses the data using the same compression parameter that was used previously, and writes the compressed data back to main memory 10. However, in contrast to the configuration of FIG. 2, the compression unit 20 of the present embodiment uses the flags in the pointers/flags memory 60 to minimize the number of blocks that must be recompressed.

More particularly, if the flag corresponding to a given block of decompressed data indicates that it has been modified, the compression unit 20 compresses that block of data in the usual manner and writes it to main memory 10. However, if the flag associated with a given block of decompressed data indicates that it has not been modified, then the compression unit 20 can copy the appropriate block of previously compressed data, as identified by the corresponding pointer. Thus, the total number of blocks that must be recompressed is reduced to only those which have been modified by the renderer 40. Since the unmodified data is only copied from one part of the memory 10 to another, it need not be read by the compression unit, thereby reducing memory bus usage.

In addition to storing the flag bits described above, the pointers/flags buffer 60 can also store pointers indicating break points between compressed blocks stored in main memory. These pointers can be set, for example, by the decompression unit 30 during decompression for use by the rendering unit 40 and the compression unit 20 during modification and recompression of the image data, respectively It will be appreciated that the present invention is not limited to the specific embodiments which have been described herein in order to facilitate an understanding of its underlying principles. For example, though the exemplary embodiments of the invention have been described with respect to color graphic printing systems, those skilled in the art will recognize that the teachings of the invention are readily applicable to any system employing data recompression. The scope of the invention, therefore, is defined by the claims which are appended hereto, rather than the foregoing description, and all equivalents which are consistent with the meaning of the claims are intended to be embraced therein.

We claim:

1. A data recompression system, comprising:

a memory for storing data;

a decompression device for receiving compressed data stored in said memory and for decompressing said compressed data to produce blocks of uncompressed data;

a data compression device for receiving blocks of uncompressed data from said decompression device and for producing compressed data blocks to be stored in said memory; and a dedicated data link for transmitting blocks of uncompressed data from said decompression device to said data compression device without intermediate storage of said blocks in said memory.

2. The recompression system of claim 1 wherein said data link includes a buffer for storing a block of uncompressed data to be transmitted to said data compression device.

3. The recompression system of claim 2, wherein said buffer has a data-access speed which is greater than that of said memory.

4. A method for processing data, comprising the steps of:

compressing the data and storing the compressed data in a memory;

retrieving the compressed data from the memory;

decompressing the retrieved data;

transmitting the decompressed data to a compressor via a data link which is separate from said memory;and recompressing the data transmitted via said link and storing the recompressed data in said memory.

5. The method of claim 4, further including the step of modifying the decompressed data before it is recompressed.

6. The method of claim 4 wherein the recompression of the data is carried out with a compression factor which is different from a compression factor used to originally compress the data.

7. The method of claim 4 wherein said data link includes a buffer having a data-access speed which is greater than that of said memory.

8. The method of claim 4 wherein the compressed data is composed of multiple blocks of data, and said decompression and recompression steps are carried out on one block of data at a time.

9. A method for processing display list data, comprising the steps of:

rendering the display list data to provide rendered data:

compressing the rendered data and storing multiple blocks of compressed rendered data;

retrieving the blocks of compressed rendered data from the memory;

decompressing the retrieved blocks of compressed rendered data and storing the blocks of decompressed rendered data;

storing pointers in a buffer which identify stored blocks of compressed rendered data which respectively correspond to each of the stored blocks of decompressed rendered data;

modifying at least some of the blocks of decompressed rendered data, and identifying the decompressed blocks which are modified;

recompressing the blocks of decompressed rendered data which have been identified as being modified and storing the blocks of recompressed rendered data in a memory; and copying stored blocks of compressed rendered data which correspond to blocks of decompressed rendered data that are not modified into said memory for storage with the blocks of recompressed rendered data.

10. The method of claim 9 wherein said blocks of compressed rendered data, blocks of decompressed rendered data, and blocks of recompressed rendered data are stored in the same memory.

11. A data recompression system, comprising:

a memory;

a pointer buffer;

a renderer configured to provide uncompressed rendered data to said memory;

a compression unit configured to retrieve and compress uncompressed rendered data stored in said memory and to store resulting blocks of compressed rendered data in said memory; and a decompression unit configured to retrieve and decompress blocks of compressed rendered data stored in said memory and to store resulting blocks of decompressed rendered data in said memory, wherein said decompression unit stores pointers in said pointer buffer when storing resulting blocks of decompressed rendered data in said memory, the pointers identifying stored blocks of compressed rendered data which respectively correspond to stored blocks of decompressed rendered data, and wherein, upon said renderer modifying at least some of the blocks of decompressed rendered data stored in said memory, said compression unit recompresses and restores only the blocks of decompressed rendered data which have been modified.

* * * * *